(12) United States Patent
Rosales

(10) Patent No.: US 11,091,210 B2
(45) Date of Patent: Aug. 17, 2021

(54) MOTOR VEHICLE LOCK

(71) Applicant: Brose Schließsysteme GmbH & Co. Kommanditgesellschaft, Wuppertal, Wuppertal (DE)

(72) Inventor: David Rosales, Rochester Hills, MI (US)

(73) Assignee: Brose Schließsysteme GmbH & Co. Kommanditgesellschaft, Wuppertal, Wuppertal (DE)

( * ) Notice: Subject to any disclaimer, the term of this patent is extended or adjusted under 35 U.S.C. 154(b) by 143 days.

(21) Appl. No.: 16/448,741

(22) Filed: Jun. 21, 2019

(65) Prior Publication Data

US 2020/0398907 A1 Dec. 24, 2020

(51) Int. Cl.
*B62D 33/037* (2006.01)
*E05B 83/18* (2014.01)
*B62D 33/027* (2006.01)

(52) U.S. Cl.
CPC ....... *B62D 33/037* (2013.01); *B62D 33/0273* (2013.01); *E05B 83/18* (2013.01); *E05Y 2900/546* (2013.01)

(58) Field of Classification Search
CPC .. B62D 33/027; B62D 33/0273; B62D 33/03; B62D 33/037; E05B 83/04; E05B 83/16; E05B 83/18; E05B 83/36
USPC .................................................. 296/50, 57.1
See application file for complete search history.

(56) References Cited

U.S. PATENT DOCUMENTS

| | | | | |
|---|---|---|---|---|
| 5,944,367 | A * | 8/1999 | Imaizumi | E05B 81/06 292/201 |
| 7,210,714 | B2 * | 5/2007 | Berghahn | E05B 81/20 292/201 |
| 10,132,106 | B2 * | 11/2018 | Rosales | E05B 77/06 |
| 10,428,563 | B2 * | 10/2019 | Kwak | E05B 83/18 |
| 2017/0089112 | A1 | 3/2017 | Rosales et al. | |
| 2018/0087298 | A1 * | 3/2018 | Strole | E05B 81/16 |

* cited by examiner

*Primary Examiner* — Jason S Daniels
(74) *Attorney, Agent, or Firm* — Brooks Kushman, P.C.

(57) ABSTRACT

A motor vehicle lock for a hatch leaf including a catch, for the interaction with a lock striker, pivotable around a catch axis from an open position in a closing direction into a main closed position. A pawl pivotable around a pawl axis from a release position in an engagement direction into a main engagement position. The pawl including a main holding surface that when the pawl is in a main closed position or a main engagement position, the main holding surface holds the catch. A cinching mechanism may drive the catch in a closing direction to a main closed position. The cinching mechanism including a pawl cinching contour and a catch cinching contour, such that as the pawl moves in an engagement direction, the pawl may drive the catch to produce the catch cinching movement.

20 Claims, 5 Drawing Sheets

MOTOR VEHICLE LOCK

TECHNICAL FIELD

The present disclosure relates to a motor vehicle lock.

BACKGROUND

Vehicles may include one or more closures, such as, hatches, doors, tailgates, or liftgates. Certain closures may close and open automatically, e.g. without the assistance of an operator. Vehicles generally include a seal or other type of weather proofing barrier positioned between the closure and the vehicle body to mitigate external elements such as moisture, precipitation, dirt, debris, and noise from entering the interior of the vehicle. The force applied to the closure, by a latch for example, must be sufficient to overcome pressure associated with the closure and the seal. Also, the vehicle may be equipped with a device or mechanism that may automatically release the latch, so the closure may move to an open position.

Often such vehicles include an additional drivetrain that may increase the size of the motor vehicle lock arrangement.

SUMMARY

The present disclosure may provide a motor vehicle lock with a cinching mechanism that may be relatively compact or smaller than other motor vehicle locks with a separate drivetrain.

First of all, the motor vehicle lock may include a catch for the interaction with a lock striker, the catch may be pivotable around a catch axis from an open position in a closing direction into a main closed position. The motor vehicle lock may also include a pawl, which may be pivotable around a pawl axis from a release position in an engagement direction into a main engagement position. The pawl may include a main holding surface, and when the catch is in a main closed position and when the pawl is in a main engagement position, the pawl may hold the catch with the main holding surface. With this arrangement the motor vehicle lock may hold the hatch leaf in its closed position.

The motor vehicle lock may be arranged on the hatch leaf, while the lock striker is arranged on the motor vehicle body. This may be provided in a vice versa fashion.

The proposed motor vehicle lock may also include a cinching mechanism, that may drive the catch in a catch cinching movement in the closing direction to the main closed position. This may facilitate the closing process of the hatch leaf for the user.

The present disclosure may use the pawl for producing the catch cinching movement. The effect of this is that no separate drivetrain is needed to produce the catch cinching movement any more. This simplifies the construction and naturally goes along with an increase in compactness.

In detail, it is proposed that the cinching mechanism may include a pawl cinching contour formed by the pawl and a catch cinching contour formed the catch, such that the pawl in a pawl drive movement in the engagement direction may drive the catch via the engagement between the pawl cinching contour and the catch cinching contour for producing the catch cinching movement.

In one or more embodiments, the pawl drive movement causes the catch cinching movement, such that a lock component, which is existent anyhow, namely the pawl, is used for producing the cinching movement. As a result, the pawl not only provides the function of holding the catch in its respective closed position. As a second function, it also produces the catch cinching movement via the engagement between the pawl cinching contour and the catch cinching contour. This double function of the pawl in itself allows for a particular compact arrangement.

The catch cinching movement may be produced by an electrical cinching actuator arrangement according to one or more embodiments. This may allow for a compact arrangement. As one example, the electrical cinching actuator arrangement may be located externally of the motor vehicle lock and may be coupled, for example, via a Bowden cable to the motor vehicle lock. In this case, the cinching actuator arrangement is not part of the motor vehicle lock.

In one or more embodiments, the pawl cinching contour and the catch cinching contour via its engagement providing a cinching gearing may be configured to produce the catch cinching movement. This arrangement may be a backdriveable design such that jamming between the pawl and the catch may be prevented.

A preliminary closed position for the catch may be provided as a safety feature depending on the field of application.

In view of the pivotability of the pawl, the cinching mechanism may be provided with a pivotable cinching lever for driving the pawl. This again allows for a particularly compact arrangement, especially, if the pivot axis of the cinching lever is arranged coaxially to the pawl axis.

According to one or more embodiments, a pawl release mechanism may be provided, which may cause a pawl release movement for the main engagement position into the direction of the release position of the pawl, such that the pawl releases the catch.

The release of the pawl may be provided by an electrical release actuator arrangement that may be provided by the cinching actuator arrangement. This may make it possible to use the cinching actuator arrangement and the drivetrain between the cinching actuator arrangement and the pawl not only to produce the catch cinching movement as noted above, but also to release the pawl. Again, the resulting double use of components leads to a particularly compact overall design.

According to yet another embodiment, a motor vehicle lock arrangement with an above noted, proposed motor vehicle lock and with an above noted electrical actuator arrangement is provided as such. All explanations given for the proposed motor vehicle lock are fully applicable to this further teaching.

As another example the motor vehicle lock may be provided in a hatch arrangement of a motor vehicle with a movable hatch leaf.

BRIEF DESCRIPTION OF THE DRAWINGS

In the following, the invention will be described with reference to a single exemplary embodiment illustrated in the drawings. In the drawings show in FIG. 1 a schematic view of a motor vehicle with a proposed motor vehicle lock, FIG. 2 the motor vehicle lock according to FIG. 1 in its demounted state, FIG. 3 the motor vehicle lock according to FIG. 2 with the catch in its open position, FIG. 4 the motor vehicle lock according to FIG. 2 with the catch in its half open position and FIG. 5 the motor vehicle lock according to FIG. 2 in its main closed position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The motor vehicle lock in question may be assigned to any kind of hatch leaf of a motor vehicle. Accordingly, the expression "hatch leaf" and "hatch arrangement" are to be understood in a broad sense. They include in particular any kind of doors of a motor vehicle such as side doors or back doors as well as tailgates, liftgates, trunk lids or engine hoods. Those also include the rear hatch leaf of a pickup truck.

In order to provide a holding function for the hatch leaf in its closed position, the motor vehicle lock may include a catch for the interaction with a lock striker and a pawl for holding the catch in its main closed position. In its main closed position, the catch is in holding engagement with the lock striker which leads to the hatch leaf to be held in its closed position.

In order to facilitate closing of the hatch leaf, which includes the movement of the catch into its main closed position against counterforces like seal pressure forces, the motor vehicle lock is provided with a cinching mechanism, which drives the catch in a catch cinching movement in its closing direction into its main closed position.

A known motor vehicle lock provided in U.S. Publication Number 2017/0089112 A1, discloses such a cinching mechanism besides the lock components catch and pawl. The cinching mechanism acts via a separate drivetrain onto the catch in order to produce the catch cinching movement. This drivetrain is coupled to an electric actuator arrangement, which is arranged separately from the motor vehicle lock.

With regard to the known motor vehicle lock, the production of the catch cinching movement requires an additional drive train, which reduces the compactness of the overall arrangement.

Figure 1:
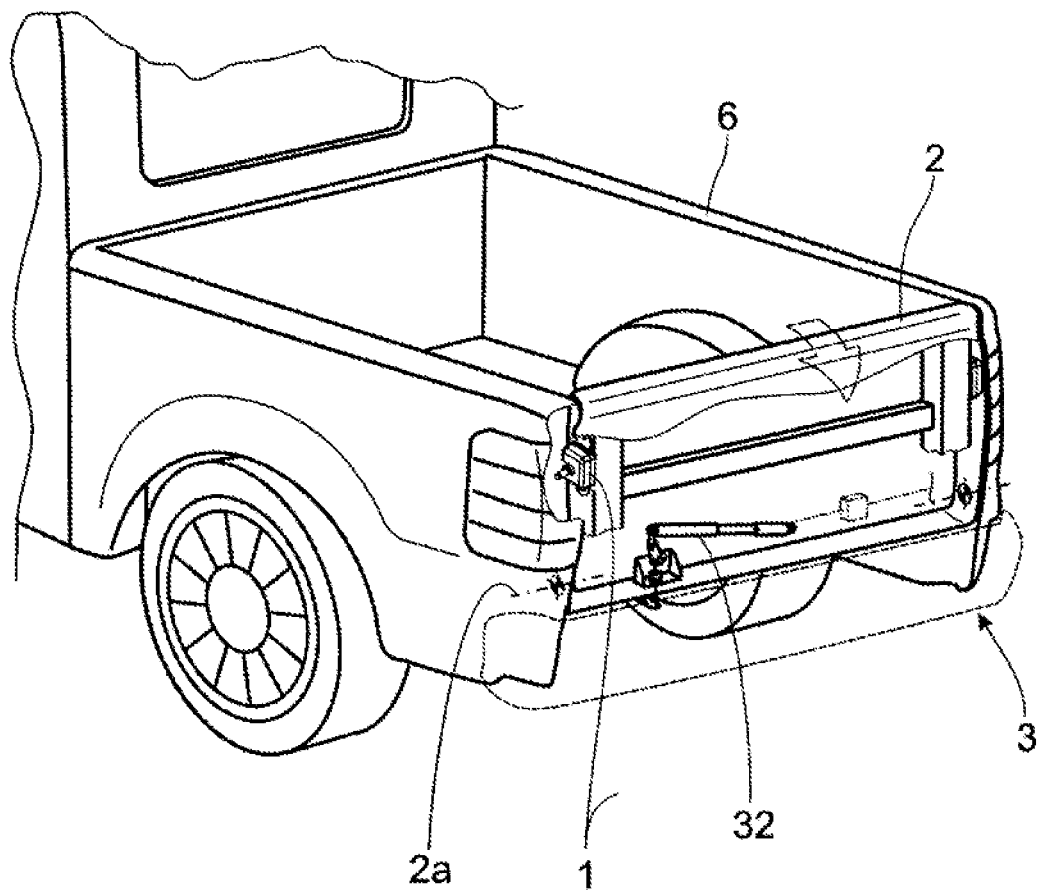

The motor vehicle shown in FIG. 1 may include a motor vehicle lock 1, which is assigned to a hatch leaf 2 of a hatch arrangement 3. Regarding the broad understanding of the expressions "hatch leaf" and "hatch arrangement", reference is made to the introductory part of the specification.

The hatch leaf 2 is here and preferably pivotable around a hatch axis 2a, which is aligned basically horizontally. It is also possible, that the hatch axis 2a is aligned vertically.

Just as a matter of completeness, it may be pointed out, that the hatch leaf 2 is assigned not only one motor vehicle lock 1, but two motor vehicle locks, that are arranged on opposite sides of the hatch leaf 2. In the following only the motor vehicle lock 1 on the left side of the hatch leaf 2 is described. All explanations given to this motor vehicle lock 1 are fully applicable to the motor vehicle lock located on the opposite side of the hatch leaf 2.

Figure 2:
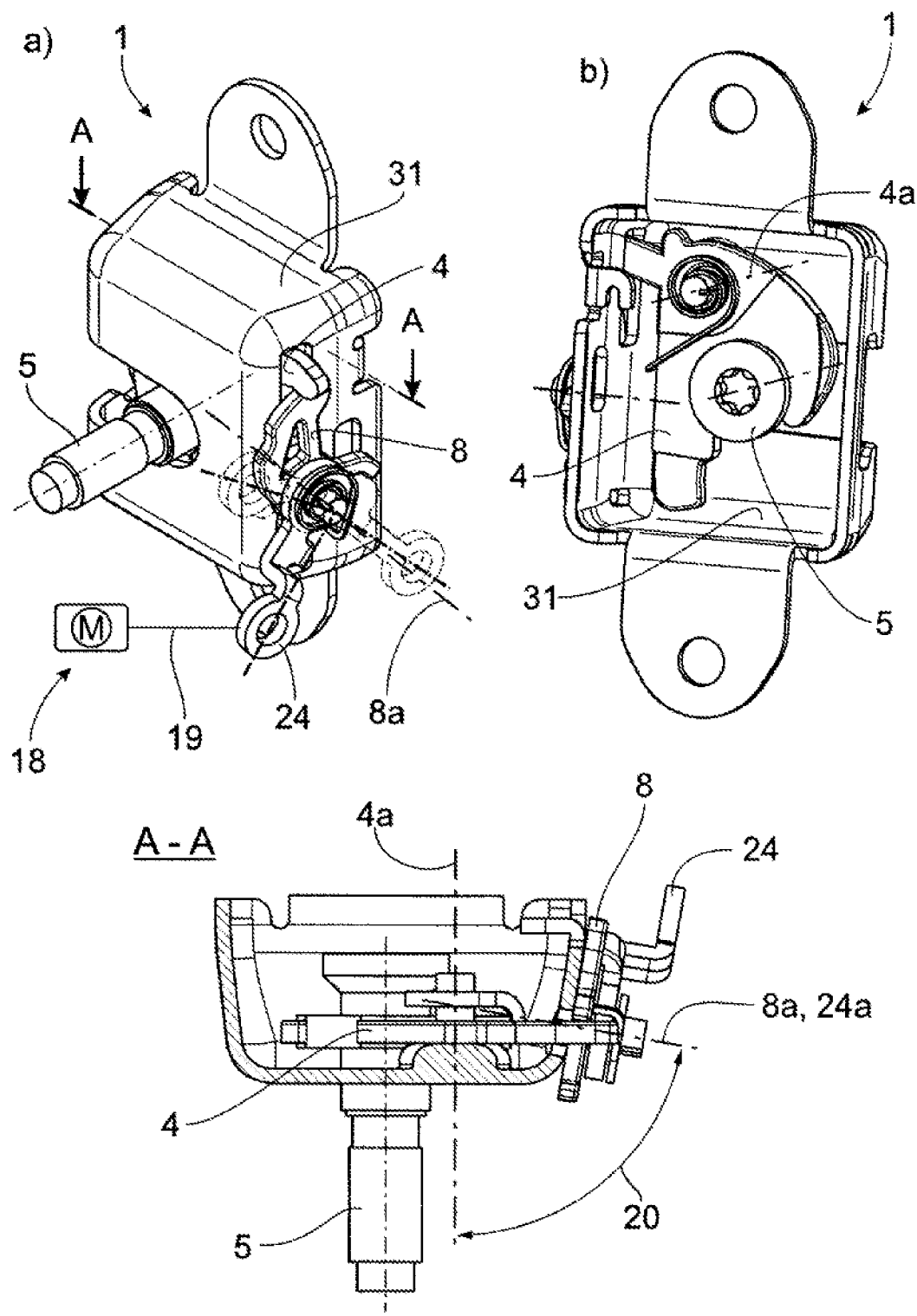

FIG. 2 shows that the motor vehicle lock 1 may include a catch 4 for the interaction with a lock striker 5, which here and preferably is located at the motor vehicle body 6. It is also possible that the lock striker 5 is positioned at the hatch leaf 2, such that the motor vehicle lock 1 is then positioned at the motor vehicle body 6.

Figure 5:
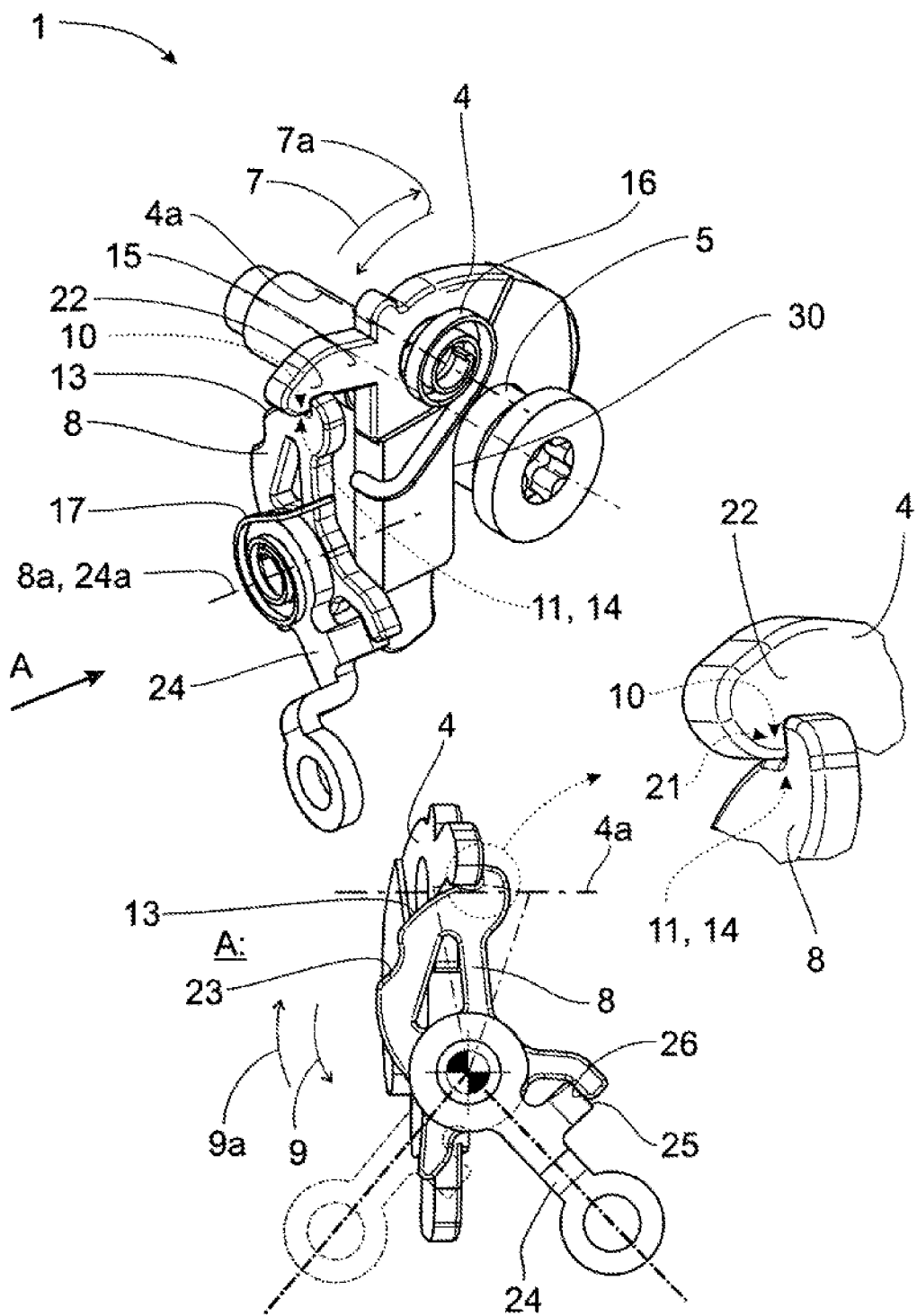

The catch 4 is pivotable around a catch axis 4a from an open position (FIG. 3) in a closing direction 7 into a main closed position (FIG. 5). The motor vehicle lock 1 further may include a pawl 8, which is pivotable around a pawl axis 8a from a release position (FIG. 3) in an engagement direction 9 into a main engagement position (FIG. 5).

The pawl 8 may include a main holding surface 10, wherein, with the catch 4 in its main closed position and the pawl 8 in its main engagement position, the pawl 8 holds the catch 4 with its main holding surface 10. For this holding function, the catch 4 may include a main counter surface 11, which correspondingly is in holding engagement with the main holding surface 10, when in its closed position. In this situation, the motor vehicle lock 1 holds the hatch leaf 2 in its closed position shown in FIG. 1.

With the catch 4 in its main closed position and the pawl 8 in its main engagement position, the pawl 8 with its main engagement surface is preferably in engagement with the catch 4 with its main holding surface 10, such that the pawl 8 holds itself in this engagement, for example by a resulting momentum (torque) in its engagement direction 9. If such momentum is not realized, a blocking element may provided to block the pawl 8 in its main engagement position against movement in its release direction 9a. The blocking element may be realized in the form of a secondary, pivotable pawl.

Figure 4:
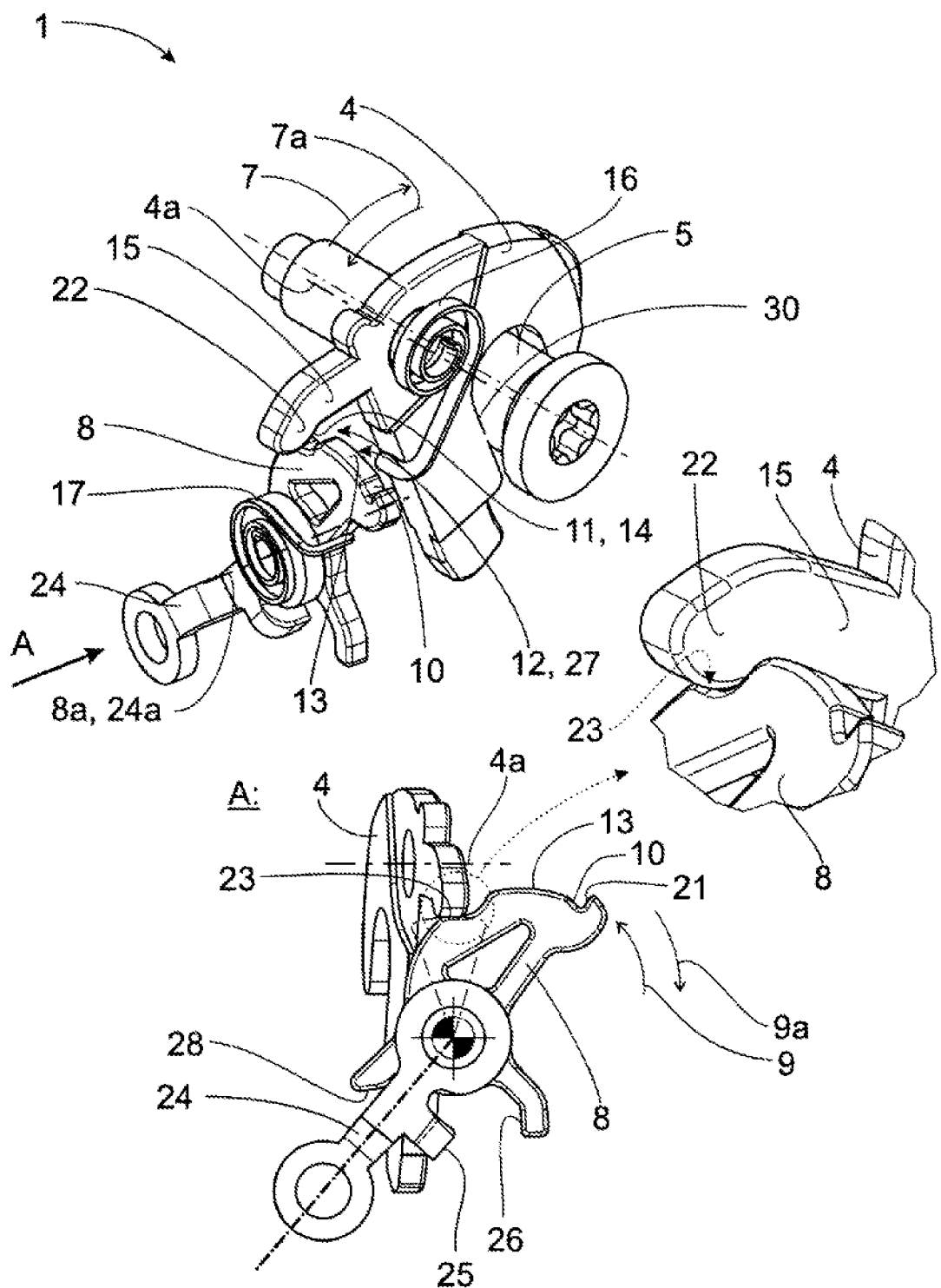

The motor vehicle lock 1 may include a cinching mechanism 12, which may be best understood by the sequence of FIG. 4 and FIG. 5. The cinching mechanism 12 is utilizing the pawl 8 for producing the catch cinching movement, as will be explained.

The cinching mechanism 12 may include a pawl cinching contour 13 at the pawl 8 and a catch cinching contour 14 at the catch 4, such that the pawl 8 in a pawl drive movement in its engagement direction 9 may drive the catch 4 via the engagement between the pawl cinching contour 13 and the catch cinching contour 14 for producing the catch cinching movement. The catch cinching contour 14 is located on a separate cinching arm 15 of the catch 4, which is extending radially from the catch axis 4a.

The catch cinching movement is shown in the sequence of FIG. 4 and FIG. 5, as noted above. The start of the catch cinching movement is shown in FIG. 4. With the pawl drive movement in the counter clockwise direction in FIG. 4, the pawl cinching contour 13 engages the catch cinching contour 14, producing the catch cinching movement into the main closed position of the catch 4, shown in FIG. 5. Here it may be noted that the catch cinching movement may well extend beyond the main closed position of the catch 4 into an overtravel position, which is not shown in the drawings.

According to the drawings, the pawl 8 is designed to provide mainly pressure forces to the catch 4. It may well be provided as an alternative, that the pawl 8 mainly provides pulling forces to the catch 4.

The catch 4 may be spring biased into its opening direction 7a by a catch spring 16, while the pawl 8 is may be spring biased in its engagement direction 9 by a pawl spring 17.

Figure 3:
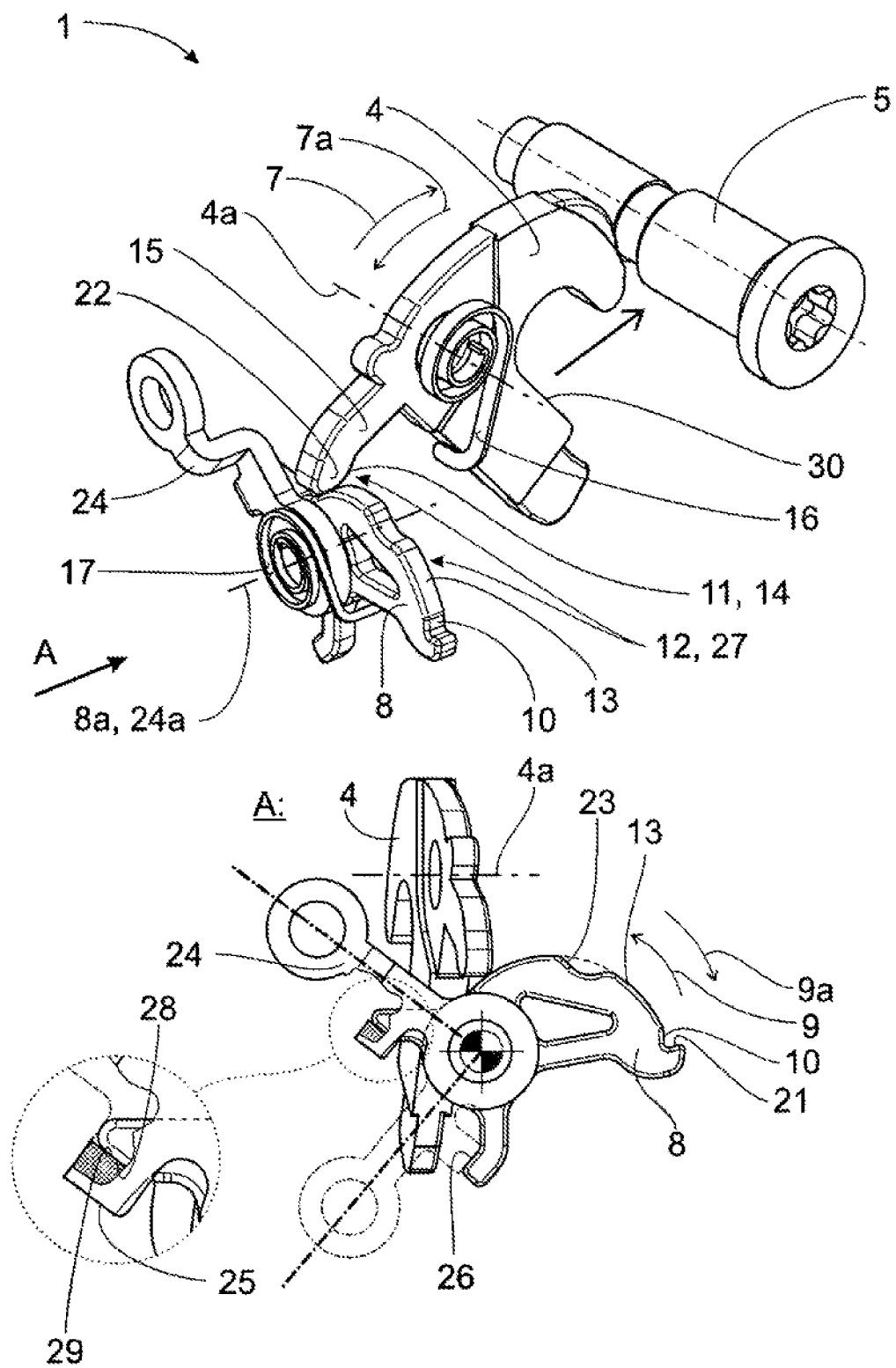

As one example, the cinching mechanism 12 may be coupled to an electrical cinching actuator arrangement 18 to drive the pawl 8 for producing the catch cinching movement as shown in the sequence of FIG. 4 and FIG. 5. The cinching actuator arrangement 18 may be an integral part of the motor vehicle lock 1, which is to be preferred if sufficient space is available for the placement of the cinching actuator arrangement 18. Alternatively, the cinching actuator arrangement 18 is located externally of the motor vehicle lock 1 and may be coupled to the cinching mechanism 12 via a Bowden cable 19, as indicated in FIG. 3. Here, the Bowden cable 19 may be a push-pull Bowden cable in order to be able to introduce drive movements into the pawl 8 for producing the catch cinching movement as well as to produce a pawl release movement to be explained later.

In the course of the catch cinching movement, the pawl cinching contour 13 and the catch cinching contour 14 via its engagement provide a cinching gearing with a gear ratio defining the conversion of the momentum (torque) on the pawl 8 into the momentum (torque) on the catch 4 for producing the catch cinching movement.

As the pawl cinching contour 13 as well as the catch cinching contour 14 may be defined in a very flexible manner, the gear ratio may vary in the course of the catch cinching movement. In one or more embodiments, in the course of the catch cinching movement, the gear ratio varies such that with constant momentum on the pawl 8 the momentum of the catch 4 increases. That is advantageous, as the counter forces produced by the hatch seals are expected to increase while the hatch is approaching its closed position.

As one example, the momentum (torque) on the pawl 8 stays constant in the course of at least part of the catch cinching movement, in the course of most part of the cinching movement. This goes along with an accordingly constant force transmitted via the above noted Bowden cable 19. This may well be realized by the above noted variation of the gear ratio.

An easy opening of the motor vehicle lock is guaranteed, if the cinching gearing between the pawl 8 and the catch 4 is backdriveable at least along a portion of the catch cinching movement. This means that after a first opening movement of the pawl 8 out of the engagement position shown in FIG. 5, the catch 4, driven at least by the catch spring 16, pushes the pawl 8 in its release direction 9*a* against the pawl spring 17, leading to the pawl 8 reaching its release position shown in FIG. 3.

The sequence of FIG. 4 and FIG. 5 shows that for producing the catch cinching movement, the pawl cinching contour 13 and the catch cinching contour 14 slide along each other, providing the above noted cinching gearing. The contact between the pawl cinching contour 13 and the catch cinching contour 14 may be a point contact or a line contact. This may vary in the course of the catch cinching movement.

As one example, the pawl cinching contour 13 is a continuous contour, which may include a radius with respect to the pawl axis 8*a*, which radius may vary along the pawl cinching contour 13 in order to modify the gear ratio of the cinching gearing as noted above.

As another example, the catch cinching movement extends from a cinching start position of the catch 4 (FIG. 4) at least to the main closed position of the catch 4 (FIG. 5). The cinching start position is a partly open position of the catch 4, which is located between the open position and the main closed position. In the illustrated embodiment, the cinching start position is a preliminary closed position of the catch 4, which will be described later.

The catch cinching movement corresponds to a certain pawl drive movement, which depends on the particular construction. The pawl drive movement may include reaching the main engagement position of the pawl 8, as shown in FIG. 5. Further the pawl drive movement may end with the main engagement position of the pawl 8. The pawl cinching contour 13 may merge into the main holding surface 10 of the pawl 8 in order to allow the pawl drive movement to end with the main engagement position of the pawl 8.

For easy manufacturing and high compactness, the pawl cinching contour 13 is located at an outer circumference of the pawl 8. As an alternative or in addition, the catch cinching contour 14 is located at an outer circumference of the catch 4. With this, the pawl 8 and/or the catch 4 may simply be stamped out of a metal plate, which is especially suitable for a mass production product as a motor vehicle lock 1.

The drawings show an interesting structural feature regarding the arrangement of the catch 4 and the pawl 8. In particular, the angle 20 between the pawl axis 8*a* and the catch axis 4*a* is such that the pawl axis 8*a* and the catch axis 4*a* are slanted to each other. As one example, the angle between the pawl axis 8*a* and the catch axis 4*a* is between 60° and 100°. As another example, the angle between the pawl axis 8*a* and the catch axis 4*a* is about 80°.

The construction shown in the drawings is such that the pawl 8 may include a blocking contour 21, while the catch 4 may include a counter blocking contour 22, which contours 21, 22 at the end of the catch cinching movement engage each other and block the drive movement of the pawl 8. This means that the cinching process is being ended by the blocking contour 21 of the pawl 8 being blocked by the counter blocking contour 22 of the catch 4. This allows to realize a simple electrical control of the cinching actuator arrangement 18, turning off the cinching actuator arrangement 18, when blocking of the pawl 8 is being detected, for example by detecting of a blocking drive current.

It is possible, that the catch 4 is assigned only two stationary positions, namely the open position according to FIG. 2 and the closed position according to FIG. 5. The catch 4 may be brought into a preliminary closed position, which is located between the open position and the main closed position. Generally, this preliminary closed position may be called a half open position of the catch 4, as indicated above.

In the preliminary closed position, the catch 4 is being held by the pawl 8 via its main holding surface 10, or, as shown in FIG. 4, by another holding surface, namely the preliminary holding surface. In the illustrated embodiment, the preliminary holding surface 23 may engage the main counter surface 11 of the catch 4. In FIG. 3 it is also indicated in dotted lines, that the preliminary holding surface 23 may also be omitted.

For introducing the respective drive movements into the pawl 8, various alternatives are possible. FIG. 3, FIG. 4 and FIG. 5 show, that the cinching mechanism 12 may include a pivotable cinching lever 24, which may engage the pawl 8 for producing the pawl drive movement. The cinching lever axis 24*a* of the cinching lever 24 is aligned coaxially to the pawl axis 8*a* of the pawl 8, making it easy for the cinching lever 24 to introduce drive movements into the pawl 8.

For introducing the pawl drive movements into the pawl 8, the cinching lever 24 may include a cinching surface 25, which is engageable with a counter cinching surface 26 on the pawl 8. This is shown in FIG. 5.

The compactness of the motor vehicle lock 1 according to the drawings is outstanding, as the motorized release of the pawl 8 is realized in a specific manner described below. First of all, a pawl release mechanism 27 is provided, which drives the pawl 8 in an above noted pawl release movement from the main engagement position (FIG. 5) into the direction of its release position (FIG. 3), namely in its release direction 9a. The pawl release mechanism 27 may include a pawl release lever for the driving engagement with the pawl 8. The release lever may be provided by the cinching lever 24 itself. This double function of the cinching lever 24 again increases the compactness of the overall arrangement. In order to introduce the drive movements into the pawl 8 for its release, the cinching lever 24 may include a release surface 28, which is engageable with a counter release surface 29 of the pawl 8, which engagement is indicated in FIG. 5 in dotted lines.

In one or more embodiments, an electrical release actuator arrangement may be coupled to the pawl release mechanism 27 to drive the pawl 8 for producing the pawl release movement. The release actuator arrangement may be provided by the cinching actuator arrangement 18, which again may serve a double function with the resulting compactness.

Driving the pawl 8 in one direction leads to producing the catch cinching movement and driving the pawl 8 in the other direction leads to the pawl 8 releasing the catch 4.

To sum up the proposed function of the shown motor vehicle lock 1, the closing process will be explained in the sequence of FIG. 3, FIG. 4 and FIG. 5 in the following.

Starting from the open position of the hatch leaf 2 shown in FIG. 3, manually moving the hatch leaf 2 into the direction of its closed position leads to the situation shown in FIG. 3. With a further movement of the hatch leaf 2, the lock striker 5 comes into engagement with a striker surface 30 of the catch 4, moving the catch 4 into its closing direction 7. This is shown in FIG. 4. Depending on the definition of the starting position for the catch cinching movement, based on this first manual closing movement of the hatch leaf 2, the cinching actuator arrangement 18 is being started by an electrical control arrangement not shown. This leads to the cinching lever 24 being moved in the counter clockwise direction in FIG. 4, allowing the cinching surface 25 to engage the counter cinching surface 26. As a result, the pawl 8 moves in its engagement direction 9, producing the catch cinching movement via the engagement between the pawl cinching contour 13 and the catch cinching contour 14.

The cinching actuator arrangement 18 is driving the pawl 8, until the blocking contour 21 engages the counter blocking contour 22, which leads to turning off the cinching actuator arrangement 18 by the electrical control arrangement.

For releasing the pawl 8, the cinching actuator arrangement 18 drives the cinching lever 24 in the opposite direction, such that the release surface 28 engages the counter release surface 29, pushing the main holding surface 10 out of engagement from the main counter surface 11. With the above noted backdriveable cinching gearing, the catch 4 pushes the pawl 8 into its release direction 9a. As an alternative, it may be provided that this release of the pawl 8 is fully driven by the release actuator arrangement, here the cinching actuator arrangement 18.

It may further be pointed out, that the proposed motor vehicle lock 1 may include a housing 31, which in a hollow interior may include at least the catch 4. The pawl 8 may be arranged outside the housing 31, which may make coupling the pawl 8 to the cinching actuator arrangement 18 particularly simple.

Finally, it may be pointed out, that another function may be assigned to the cinching actuator arrangement 18. The cinching actuator arrangement 18 may also serve as a drive for motorized movement of the hatch leaf 2. In FIG. 1, a drive for the motorized movement of the hatch leaf 2 is assigned the reference number 32. However, in the shown embodiment, this drive 32 is not coupled to the cinching actuator arrangement 18 and its display in the drawings serves only for clarification.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle lock for use in a vehicle including a hatch leaf, the motor vehicle lock comprising:
   a catch configured to engage a lock striker and pivotable about a catch axis in a closing direction from an open position to a main closed position;
   a pawl pivotable about a pawl axis in an engagement direction from a release position to a main engagement position, and including a main holding surface, wherein when the catch is in the main closed position and when the pawl is in the main engagement position, the main holding surface of the pawl holds the catch; and
   a cinching mechanism configured to drive the catch in a catch cinching movement in the closing direction to the main closed position,
   wherein the cinching mechanism includes a pawl cinching contour formed by the pawl and a catch cinching contour formed by the catch, such that a pawl drive movement moves the pawl in the engagement direction, the catch is driven via an engagement between the pawl cinching contour and the catch cinching contour to generate a catch cinching movement.

2. The motor vehicle lock of claim 1, wherein the cinching mechanism is coupled directly to an electrical cinching actuator arrangement configured to drive the pawl to generate the catch cinching movement.

3. The motor vehicle lock of claim 2, wherein the pawl cinching contour and the catch cinching contour engage to form a cinching gearing having a gear ratio, wherein the gear ratio varies during the catch cinching movement.

4. The motor vehicle lock of claim 3, wherein the cinching gearing between the pawl and the catch is backdriveable at least along a portion of the catch cinching movement.

5. The motor vehicle lock of claim 2, wherein the cinching actuator arrangement is spaced apart from the motor vehicle lock.

6. The motor vehicle lock of claim 3, wherein when the pawl moves at a constant momentum, a momentum of the catch increases.

7. The motor vehicle lock of claim 1, wherein the pawl cinching contour is a continuous contour including a radius, formed with respect to the pawl axis, wherein the radius varies along the pawl cinching contour, wherein during the catch cinching movement, the pawl cinching contour and the catch cinching contour slide along each other.

8. The motor vehicle lock of claim 1, wherein during the catch cinching, the catch is configured to move from a cinching start position to at least the main closed position of the catch, wherein when the catch is in the cinching start position, the catch is in a partly open position, located between the open position and the main closed position.

9. The motor vehicle lock of claim 1, wherein during the pawl drive movement of the pawl, the pawl is configured to move to the main engagement position and/or such that the catch cinching contour merges into the main holding surface of the pawl.

10. The motor vehicle lock of claim 1, wherein the pawl cinching contour is formed by an outer circumference of the pawl and/or the catch cinching contour is formed by an outer circumference of the catch, and/or the pawl axis and the catch axis are each arranged to form an angle with respect to each other, wherein the angle between the pawl axis and the catch axis is between 60° and 100°.

11. The motor vehicle lock of claim 1, wherein the pawl includes a blocking contour and the catch includes a counter blocking contour, wherein at an end of the catch cinching movement, the blocking contour and the counter blocking contour engage each other to block the drive movement of the pawl.

12. The motor vehicle lock of claim 1, wherein the catch is configured to move into a preliminary closed position, located between the open position and the main closed position, wherein when the catch is in the preliminary closed position, the catch held by the pawl via the main holding surface or another holding surface, and wherein a cinching start position and the preliminary closed position of the catch are the same.

13. The motor vehicle lock of claim 1, wherein the cinching mechanism includes a cinching lever configured to pivot and engage the pawl to generate the pawl drive movement.

14. The motor vehicle lock of claim 13, further comprising a pawl release mechanism configured to drive the pawl in a pawl release movement from the main engagement position in the direction of a pawl release position, wherein the release mechanism includes a pawl release lever configured to move into driving engagement with the pawl, and wherein the pawl release lever is formed by the cinching lever.

15. The motor vehicle lock of claim 14, further comprising an electrical release actuator arrangement coupled to the pawl release mechanism wherein the electrical release actuator arrangement is provided by the cinching actuator arrangement.

16. A motor vehicle lock for use in a vehicle including a vehicle body and a hatch leaf, the motor vehicle lock comprising:

a catch configured to pivot about a catch axis in a first direction between an open position, a half open position, and a fully closed position, wherein the catch engages a striker, disposed on the vehicle body or on the hatch leaf, when the catch is in the half open position and the fully closed position;

a pawl pivotable about a pawl axis in a second direction to engage and pivot the catch; and a cinching lever coupled to the pawl configured to pivot in the second direction, wherein when the cinching lever pivots in the second direction, the catch moves from the open position, to the half open position, and to the fully closed position.

17. The motor vehicle lock of claim 16, further comprising an electrical actuator coupled to the cinching lever and configured to pivot the cinching lever in the second direction.

18. The motor vehicle lock of claim 16, wherein the catch includes a catch cinching contour, wherein a portion of an outer periphery of the pawl has an arcuate shape, wherein the pawl includes a preliminary holding surface, recessed from the outer periphery, and wherein when the catch is in the half open position, the preliminary holding surface engages the catch cinching contour.

19. The motor vehicle lock of claim 18, wherein the pawl includes a main holding surface, wherein when the catch is in the fully closed position, the main holding surface engages the catch cinching contour.

20. A motor vehicle lock for use in a vehicle including a vehicle body and a hatch leaf, the motor vehicle lock comprising:

a catch configured to pivot about a catch axis in a first direction between an open position, a half open position, and a fully closed position, wherein the catch engages a striker, disposed on the vehicle body or on the hatch leaf, when the catch is in the half open position and the fully closed position;

a pawl pivotable about a pawl axis in a second direction to engage and pivot the catch; and a cinching lever coupled to the pawl configured to pivot about the pawl axis in the second direction, wherein when the cinching lever pivots in the second direction, the catch moves from the open position, to the half open position, and to the fully closed position.

* * * * *